US012775568B1

(12) United States Patent
Lyubomirsky et al.

(10) Patent No.: US 12,775,568 B1
(45) Date of Patent: Oct. 27, 2026

(54) SWITCHING DEVICE WITH IN-TRANSIT-COMPUTE FUNCTION

(71) Applicant: Astera Labs, Inc., Santa Clara, CA (US)

(72) Inventors: Ilya Lyubomirsky, Pleasanton, CA (US); Enrique Musoll, San Jose, CA (US); Caleb Andrew Shetland, Santa Clara, CA (US); Christian Markus Petersen, Golden, CO (US); Hemant Vinchure, San Jose, CA (US); Wesley Wai Lek Yung, North Vancouver (CA); Vikram Sharma, Pleasanton, CA (US); Jitendra Mohan, Santa Clara, CA (US)

(73) Assignee: Astera Labs, Inc., San Jose, CA (US)

( * ) Notice: Subject to any disclaimer, the term of this patent is extended or adjusted under 35 U.S.C. 154(b) by 0 days.

(21) Appl. No.: 19/039,036

(22) Filed: Jan. 28, 2025

Related U.S. Application Data

(60) Provisional application No. 63/635,559, filed on Apr. 17, 2024, provisional application No. 63/626,479, filed on Jan. 29, 2024.

(51) Int. Cl.
*G06F 13/40* (2006.01)
*G06F 9/54* (2006.01)

(52) U.S. Cl.
CPC .......... *G06F 13/4022* (2013.01); *G06F 9/544* (2013.01); *G06F 2209/543* (2013.01)

(58) Field of Classification Search
CPC . G06F 13/4022; G06F 9/544; G06F 2209/543
See application file for complete search history.

(56) References Cited

U.S. PATENT DOCUMENTS

| | | | | |
|---|---|---|---|---|
| 12,537,771 | B1 * | 1/2026 | Pomeranz | H04L 47/129 |
| 2024/0152761 | A1 * | 5/2024 | Chole | G06F 8/433 |
| 2024/0289419 | A1 * | 8/2024 | Gagnon, Jr. | G06F 17/16 |
| 2024/0319998 | A1 * | 9/2024 | Sadasivam | G06F 9/3001 |
| 2025/0007856 | A1 * | 1/2025 | Oltchik | H04L 47/821 |
| 2025/0013499 | A1 * | 1/2025 | Michaelis | G06F 9/5038 |

OTHER PUBLICATIONS

Shoeybi et al., "Megatron-LM: Training Multi-Billion Parameter Language Models Using Model Parallelism," https://arxiv.org/list/cs.CL (1909.08053v4), Mar. 13, 2020, 15 pages.

* cited by examiner

*Primary Examiner* — Phong H Dang
(74) *Attorney, Agent, or Firm* — Charles Shemwell

(57) ABSTRACT

A switch IC includes computational circuitry to execute arithmetic and/or logic functions with respect to data otherwise propagating, through the switch, between or among switch-interconnected client ICs.

20 Claims, 7 Drawing Sheets

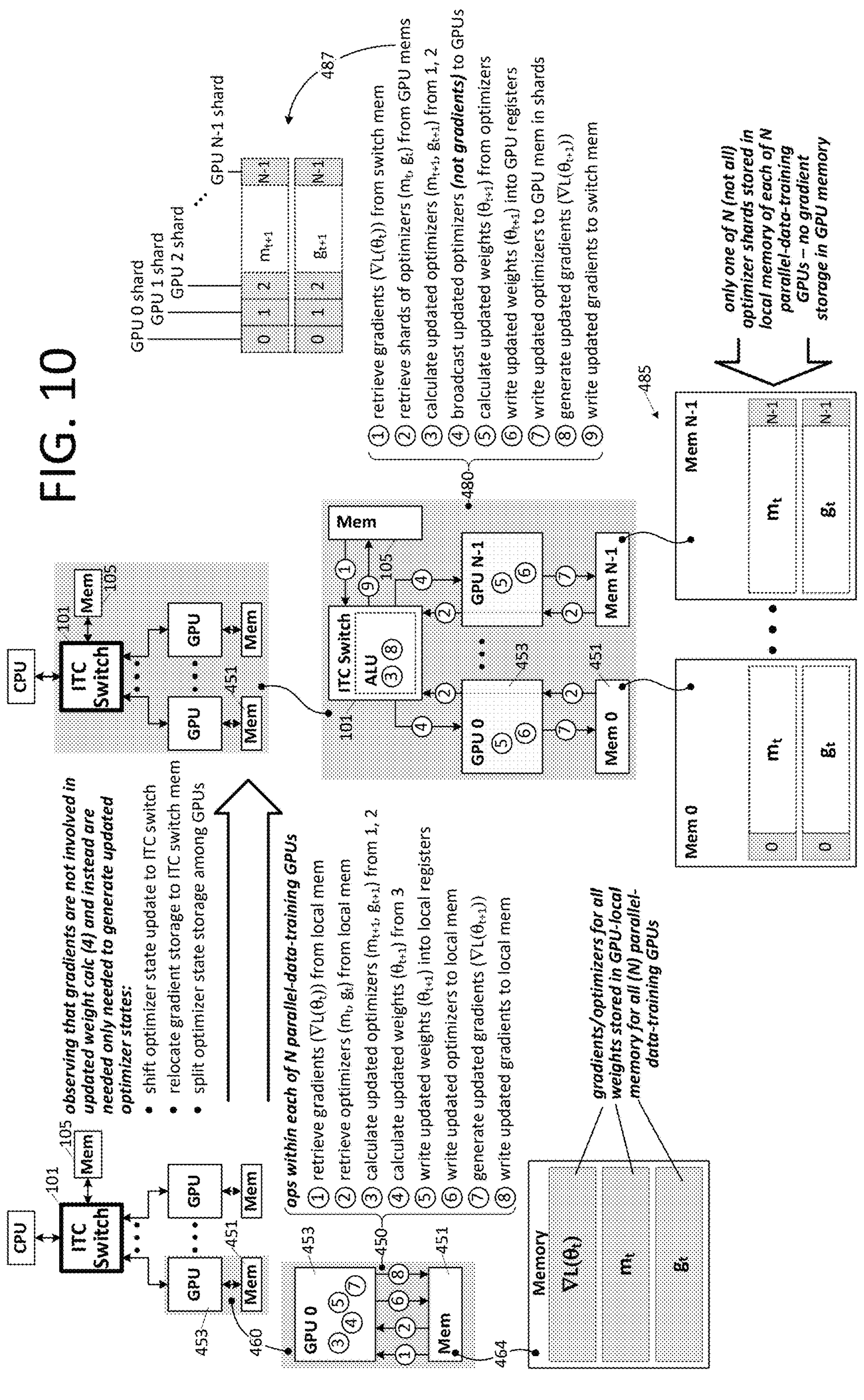
FIG. 10
CPU
ITC Switch
Mem
GPU
101
105
451
453
460
464
450
GPU 0
Memory
$\nabla L(\theta_t)$
$m_t$
$g_t$
gradients/optimizers for all weights stored in GPU-local memory for all (N) parallel-data-training GPUs
ops within each of N parallel-data-training GPUs
① retrieve gradients ($\nabla L(\theta_t)$) from local mem
② retrieve optimizers ($m_t$, $g_t$) from local mem
③ calculate updated optimizers ($m_{t+1}$, $g_{t+1}$) from 1, 2
④ calculate updated weights ($\theta_{t+1}$) from 3
⑤ write updated weights ($\theta_{t+1}$) into local registers
⑥ write updated optimizers to local mem
⑦ generate updated gradients ($\nabla L(\theta_{t+1})$)
⑧ write updated gradients to local mem
observing that gradients are not involved in updated weight calc (4) and instead are needed only needed to generate updated optimizer states:
• shift optimizer state update to ITC switch
• relocate gradient storage to ITC switch mem
• split optimizer state storage among GPUs
ITC Switch
ALU
GPU N-1
Mem 0
Mem N-1
480
485
487
① retrieve gradients ($\nabla L(\theta_t)$) from switch mem
② retrieve shards of optimizers ($m_t$, $g_t$) from GPU mems
③ calculate updated optimizers ($m_{t+1}$, $g_{t+1}$) from 1, 2
④ broadcast updated optimizers (not gradients) to GPUs
⑤ calculate updated weights ($\theta_{t+1}$) from optimizers
⑥ write updated weights ($\theta_{t+1}$) into GPU registers
⑦ write updated optimizers to GPU mem in shards
⑧ generate updated gradients ($\nabla L(\theta_{t+1})$)
⑨ write updated gradients to switch mem
GPU 0 shard
GPU 1 shard
GPU 2 shard
GPU N-1 shard
$m_{t+1}$
$g_{t+1}$
only one of N (not all) optimizer shards stored in local memory of each of N parallel-data-training GPUs -- no gradient storage in GPU memory

FIG. 11

$$m_{t+1} = \gamma_1 m_t + (1 - \gamma_1) \nabla \mathcal{L}(\theta_t)$$
$$g_{t+1} = \gamma_2 g_t + (1 - \gamma_2) \nabla \mathcal{L}(\theta_t)^2$$

*Optimizer States*
$m_t$: exponentially averaged gradient
$g_t$: exp averaged gradient squared $$\hat{m}_{t+1} = \frac{m_{t+1}}{1 - \gamma_1^{(t+1)}}$$
$$\hat{g}_{t+1} = \frac{g_{t+1}}{1 - \gamma_2^{(t+1)}}$$

*Bias-Corrected Optimizer States*
requires knowledge of iteration state (t)

$$\theta_{t+1} = \theta_t - \frac{\alpha \hat{m}_{t+1}}{\sqrt{\hat{g}_{t+1}} + \epsilon}$$

*Weight Update*
optimizer ratio 'r'

FIG. 12

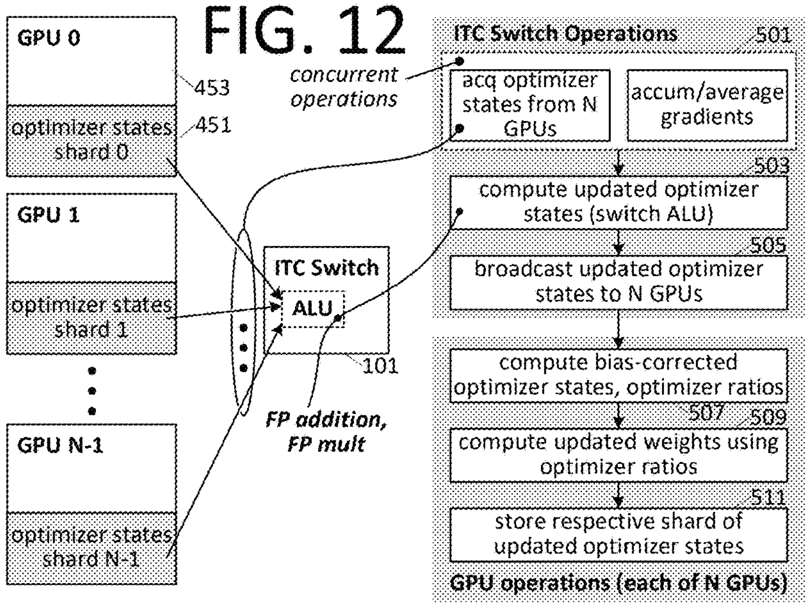

FIG. 13

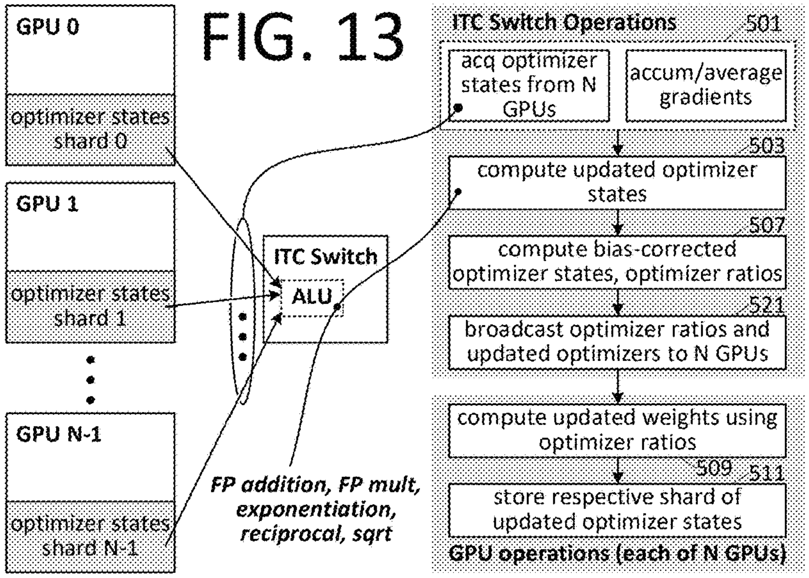

FIG. 14

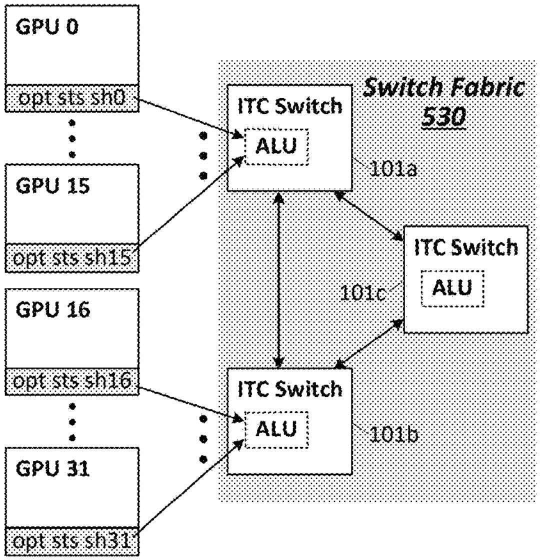

SWITCHING DEVICE WITH IN-TRANSIT-COMPUTE FUNCTION

CROSS REFERENCE TO RELATED APPLICATIONS

This application hereby claims priority to and incorporates by reference U.S. Provisional Application No. 63/635,559 filed Apr. 17, 2024 and U.S. Provisional Application No. 63/626,479 filed Jan. 29, 2024.

BRIEF DESCRIPTION OF THE DRAWING

The various embodiments disclosed herein are illustrated by way of example, and not by way of limitation, in the figures of the accompanying drawings and in which like reference numerals refer to similar elements and in which:

FIG. 10 illustrates another application of the ITC switch shown in FIG. 1, in this case relocating storage of gradient-descent operands from worker GPU memory to switch-attached memory and shifting otherwise duplicative gradient and optimizer-state update operations from the worker GPUs to the ITC-switch compute engine;

FIG. 11 illustrates exemplary computations executed to generate updated weight operands within the compute system of Figured 10;

FIGS. 12 and 13 illustrate differing allocations of the FIG.-11 weight-update computations between the ITC switch and worker GPUs of the FIG.-10 compute system;

FIG. 14 illustrates an alternative embodiment of the compute system of FIG. 10, in this instance including a switch fabric formed by multiple switch ICs including, for example, two or more ITC switches;

DETAILED DESCRIPTION

Figure 1:
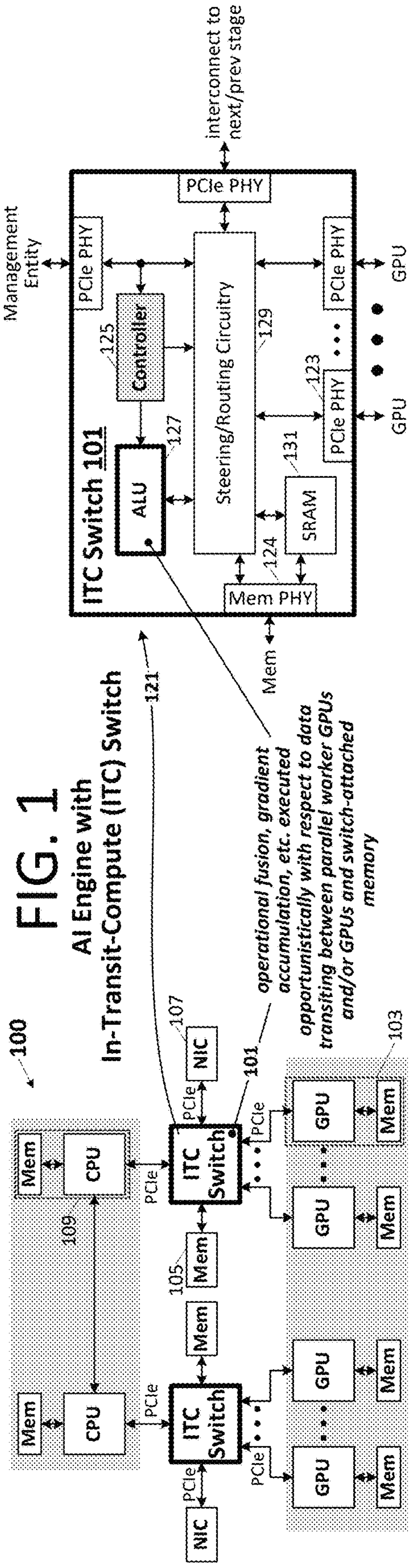
FIG. 1 illustrates an embodiment of a computing system having one or more in-transit-compute (ITC) switches to perform compute operations with respect to data in transit to/from/between various attached devices.

In various embodiments herein, an integrated circuit (IC) switch includes computational circuitry to execute arithmetic and/or logic functions with respect to data otherwise propagating, through the switch, between or among switch-interconnected client ICs. In a number of implementations, the client ICs include multiple processor ICs (e.g., graphics processing units (GPUs), tensor processing units (TPUs), digital signal processors (DSPs), etc.) that generate and exchange partial computation results (generated in parallel within respective processor ICs) via the switch IC-"in-transit" data which the switch IC selectively routes to the computational unit for opportunistic and in-situ arithmetic/logic processing before routing the result to one or more destination ICs (e.g., one or more or all of the processor ICs, a memory IC or memory subsystem fronted by a memory-control IC, etc.) or internal storage. In a more specific embodiment, worker GPUs (and/or TPUs and/or other processor ICs) deployed within a learning-based artificial-intelligence (AI) compute network collaboratively execute generalized matrix multiplication (GEMM) operations, activation functions, matrix transforms and other arithmetic/logic operations (e.g., to train and perform generative functions within a given AI model), forwarding respective partial product results (e.g., each representing a respective fragment of a matrix multiply product) to the switch. Instead of merely broadcasting the incoming partial products to all other worker GPUs for partial product reduction per convention (i.e., routing each partial product from its respective ingress port to multiple egress ports such that each GPU obtains separate copies of all partial products and adds those copies together to yield a reduced, final matrix-multiply result), the switch IC routes the incoming partial products to the embedded computational unit for in situ summation—a centralized arithmetic operation that avoids the both the extensive data exchange (signaling bandwidth within the GPUs and switch IC) otherwise required to transport the partial product from each of N worker GPUs to all other worker GPUs ($N^2$ partial-product transfers, including N partial product transfers from respective worker GPUs to the switch IC and $N^*(N-1)$ partial-product transfers from the switch IC to worker GPUs) and the redundant partial product reduction (i.e., single, centralized partial-product summation within the switch IC rather than N redundant partial-product summations within the N GPUs). The switch IC, referred to herein as an in-transit-compute (ITC) switch in view of the centralized/unified computational services it provides with respect to data otherwise in transit between worker GPUs (or between worker GPUs and switch-attached memory), may perform numerous other arithmetic/logical operations with respect to system data generated within and/or passing between AI model layers, including for example and without limitation, backward-pass all-reduce (i.e., partial product reduction), partial-product reduction with dropout, residual data addition, etc., including fusing any two or more of those operations.

FIG. 1 illustrates an embodiment of a computing system 100 having one or more ITC switches 101 (two in the depicted example) to perform compute operations with respect to data in transit (i.e., routed within the ITC switch between ingress port and one or more egress ports) to/from/between various attached devices including, for example and without limitation, multiple worker GPUs 103 (which, in all embodiments discussed herein, may alternatively or additionally include TPUs, DSPs and/or any other practicable matrix-multiply engines), switch-attached memory 105, network interface component 107 (NIC), general-purpose processor 109 (CPU and local memory). In the specific example shown and embodiments discussed below, each ITC switch 101 includes multiple PCIe-compliant physical signaling interfaces (i.e., "PHYs" compliant with one or more Peripheral Component Interconnect Express communication specifications) coupled respectively to the individual worker GPUs, NIC and CPU, and optionally to a memory control component that forms the front end of memory 105 (though the memory controller may alternatively be integrated into the ITC switch and include a physical signaling interface to be coupled to/communicate with one or more memory modules according to JEDEC or other memory interconnect/control standards). In all cases, ITC switch 101 may include PHYs compliant with various alternative and/or additional standards-based and/or proprietary specifications including, for example and without limitation, Ethernet, Serial ATA (SATA), Serial-Attached SCSI (SAS), Fire Wire (IEEE 1394), RapidIO, etc. (with such PHYs implementing, in whole or part, corresponding signaling ports), including PHYs in any practicable combination of those various implementations (e.g., one or more PCIe PHYs in combination with one or more Ethernet PHYs, etc.). Likewise, while generally shown and described herein as performing a PCIe switching function, the various ITC switch embodiments presented herein may alternatively or additionally perform switching functions with respect to data streams-packetized or otherwise-received via various alternative or additional PHY implementations (including parallel-bus PHYs), and may support any practicable higher-level protocols (e.g., memory-semantic protocols such as CXL or OpenCAPI/OMI, Gen-Z, etc.) operating over those PHYs, including any practicable standards-based and/or proprietary protocols.

Referring to detail view 121 (still FIG. 1), each ITC switch includes the aforementioned PCIe PHYs 123, memory PHY 124 (which may also be a PCIe PHY), control circuitry 125, computation engine 127 (depicted as an arithmetic logic unit (ALU)) and steering/routing circuitry 129, the latter to selectively route (according to routing control information from controller 125) data streams arriving via any given PHY to any one or more others of the PHYs, and/or to or from ALU or internal memory buffer 131 (implemented, for example, by a static random access memory (SRAM) installation). Through this architecture, data transiting between parallel-worker GPUs 103 and/or between GPUs and memory 105 may be strategically routed through ALU 127 to enable various arithmetic and/or logic computations (otherwise carried out within the parallel worker GPUs) to be executed within ITC switch 101, significantly reducing the worker-GPU processing and memory overload (capacity and bandwidth) that constrains modern AI engines. In other embodiments, data retrieved from the worker GPUs and/or other sources may be routed to computation engine 127 for arithmetic/logical computation—generating per-iteration updated operands, for instance—and then returned to the worker GPUs (and/or other destinations) for application therein.

Figure 2:
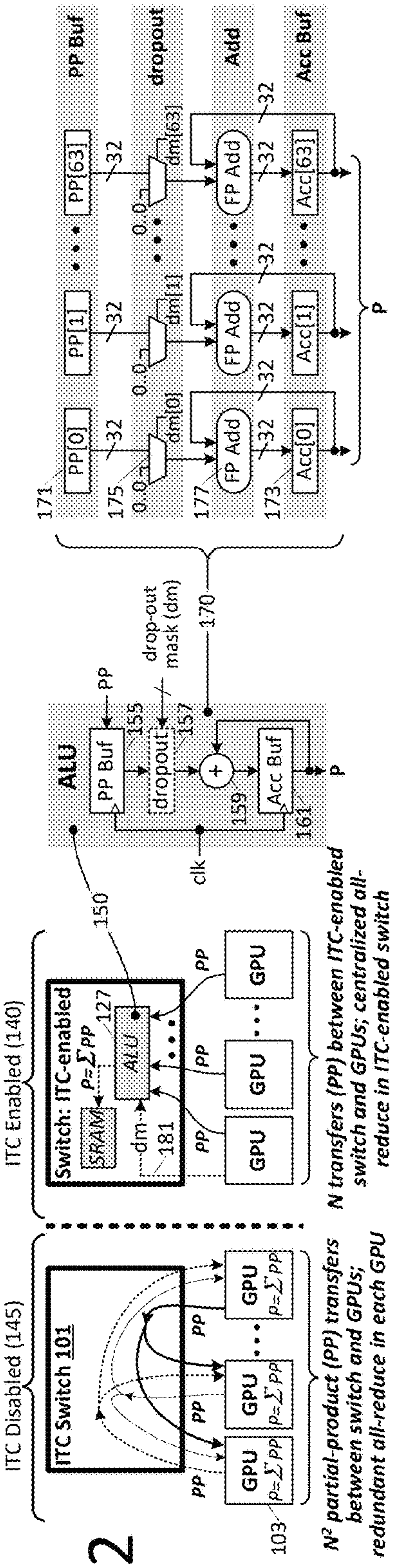
FIG. 2 contrasts processing, memory and signaling bandwidth requirements for an exemplary partial product reduction within the AI engine of FIG. 1 with and without enabling in-transit compute within the ITC switch component(s)

FIG. 2 contrasts processing, memory and signaling bandwidth requirements for an exemplary partial product reduction (i.e., generating a sum of multiple partial matrix-multiplication products generated within respective worker GPUs and thereby reducing the multiple partial matrix-multiplication products to a single complete matrix-multiplication result) within the Figure—1 AI engine under two scenarios: ITC function enabled 140 and ITC function disabled 145. When the ITC function is enabled—that is, when ITC switch 101 is configured to route incoming partial products to ALU 127 (e.g., a routing path implemented within the FIG.-1 steering/routing circuitry 129 in response to control/configuration packets delivered from host CPU or other management entity to switch-resident control circuitry 125)—the ALU executes the partial-product reduction (generating, as a finalized matrix multiplication product, P, a sum of all N partial products (PP)) instead of the worker GPUs, selectively storing the final multiplication product within near memory (e.g., the buffer memory 131 and/or switch-attached memory 105 shown in FIG. 1), broadcasting the final product to the worker GPUs (so that each obtains a copy) and/or transmitting the final product to the next-layer processing entity via NIC (element 107 of FIG. 1).

Continuing with the ITC-enabled operation shown at 140 in FIG. 2 and assuming for purposes of comparison that the completed/final multiplication product is broadcast (i.e., transferred) to each of N worker GPUs, a total of 2N product transfers (N partial-product transfers from GPUs to switch and N final product transfers from switch to GPUs) are required to achieve the same result that, without in-transit compute within ITC switch 101, typically requires $N^2$ transfers as discussed below (e.g., 64 transfers versus 1024 transfers in a switch IC serving N=32 worker GPUs), with only a single, centralized/unified (in-situ within ITC switch 101) summation of partial products instead of N redundant partial product summations (as discussed below in context of ITC-disabled operation 145). Moreover, in terms of critical GPU memory resources, only one data matrix need be stored per GPU memory at any given time (i.e., input data to start, followed by progressively accumulated partial product and then, upon receipt from ITC switch 101, completed product), whereas multiple (as many as N) partial products may require storage in each GPU-attached memory in the ITC-disabled case, straining both capacity and bandwidth of GPU-attached memory.

Still referring to FIG. 2, the switch-embedded ALU 127 (or other computation circuitry) may be implemented generally as shown in exemplary detail view 150—having a partial-product buffer 155, optional drop-out circuitry 157 (e.g., for zeroing or otherwise deterministically pre-setting selected values within the final multiplication product and thereby introducing training-enhancing noise), summation circuit 159 and accumulation buffer 161 coupled as shown to carry out incremental (iterative/cyclical) product accumulation. More specifically, the buffers (or registers) 155 and 161 are iteratively loaded with a partial product and incremental accumulation result, respectively, in response to a clock signal ("clk," which may be, for example, a core functional clock within the ITC switch or a lower or higher frequency derivation thereof), with the optional dropout circuit 157 and summation circuit 159 operating on the contents of the partial-product buffer and accumulation buffer during each clock cycle-adding the buffered partial product with the accumulation buffer content to produce a sequentially/iteratively updated (one update per clock cycle) accumulation total at the input to the accumulation buffer. Thus, at each clock edge (rising and/or falling-marking the start of a new summation cycle), a new partial product is loaded into buffer 155 and a new accumulated product (the sum of the prior-cycle contents of the partial-product and accumulation buffers, subject to optional dropout) is loaded into accumulation buffer 161. Accordingly, in the case of N partial products received from N worker GPUs and an ALU sized to accumulate one of the partial products into the accumulation buffer in each summation cycle (i.e., partial product buffer and accumulation buffer containing m*n registers to enable per-cycle storage of all constituent values within an m*n matrix), ALU 127 will produce a final product result after N clock cycles (i.e., N partial-product accumulation intervals). Larger or smaller ALU circuits (i.e., having wider buffers, dropout circuitry and summation circuitry) may produce a final product in fewer than N clock cycles or more than N clock cycles, respectively, including, in a maximally parallel implementation, adding all N partial products in a single summation cycle.

Detail view 170 (still FIG. 2) illustrates an exemplary implementation of the partial product buffer, dropout circuitry, summation circuitry and accumulation buffer shown at 150—in this case containing individual register elements 171/173, dropout multiplexers 175 and adder circuits 177 in sufficient quantity and size to operate, in each clock cycle, on sixty-four 32-bit floating point values (e.g., an IEEE 32-bit floating-point format (FP32) consisting of a sign bit, 8-bit exponent field and 23 bit fractional field). The ALU circuit components may be implemented in larger or smaller quantities/sizes to operate on larger or smaller quantities of matrix values in alternative embodiments (e.g., all values within an m*n partial-product array in the case where m*n>64) and/or larger or smaller floating-point formats (FP8, FP16, FP64, etc.) may be used in all cases, as may integer formats or any other practicable numeric format.

Continuing with the exemplary ALU detail at 170, the contents of registers 171 (collectively forming the partial-product buffer) are supplied to respective dropout multiplexers 175 which, according to respective bits of a dropout mask value (dm[63:0]), forward to corresponding adder circuits 177 either (i) a predetermined dropout value (e.g., zero in this example as represented by "0 . . . 0") or (ii) the register-supplied partial-product element. Each of the adder circuits 177 (floating-point adders in this example) adds the value forwarded by the corresponding dropout multiplexer to the content of a respective accumulator register 173, outputting the sum to be loaded into the accumulation register at the ensuing clock edge. By this operation, any unmasked summation path (e.g., dropout mask bit=0) will produce, within the constituent accumulation register, a sum of the partial product values sequentially loaded into the corresponding partial-product register, while any masked summation path (e.g., dropout mask bit=1) will yield a sum of the predetermined dropout values (zero in this example). Though not specifically shown, a control signal may be asserted to zero or otherwise clear/reset the accumulation buffer content—for example by multiplexing a 0 . . . 0 value to the floating point adder instead of the content from the corresponding accumulation register—at or prior to the start of a given partial-product reduction (i.e., after completing a prior partial-product reduction and outputting the completed product to one or more destinations within and/or external to the host ITC switch). Also, while partial-product buffer and accumulation buffer implementations are depicted in FIG. 2 as discrete/dedicated sets of registers, either or both buffers may alternatively be constituted by sets of memory cells within an addressable memory array (e.g., within SRAM 131 shown in FIG. 1). Further, where the dropout function is implemented within the switch-embedded ALU, the dropout mask ("dm") may be sourced by one or more of the worker GPUs (e.g., as denoted conceptually by arrow 181 in FIG. 2) or by mask-generating circuitry implemented within the ITC switch (e.g., one or more pseudo-random number generators, pseudo-random binary sequencers, and/or any other number/pattern generating circuits).

When the ITC function is disabled (as shown at 145 in FIG. 2), partial product reduction (summation of the partial products generated by all worker GPUs) is executed redundantly within each GPU 103—an arrangement that requires the partial product generated by each worker GPU to be transferred via switch IC 101 to all other worker GPUs. Accordingly, each of N worker GPUs (N being, for example, between 16 and 40 per ITC switch, though more or fewer worker GPUs may be coupled to a given ITC switch in alternative embodiments) transmits its partial product to switch IC 101 which, in turn, broadcasts that partial product to the other N−1 GPUs—in all, N partial-product transfers to the switch and N*N−1 partial-product transfers from the switch to the worker GPUs for a total of $N^2$ partial product transfers between the switch and worker GPUs. Each worker GPU typically stores the N−1 inbound partial products generated by counterpart worker GPU in local memory (consuming precious bandwidth and capacity) and then executes the partial product reduction (GPU processing overhead) so that N duplicative (redundant) partial product reductions are executed to synchronously render final multiplication products within all individual worker GPUs. While a switch lacking ITC capability (or for which the ITC capability is disabled) may transfer all partial products to only one GPU for PPR and then transfer the PPR result (via switch IC) to all other GPUs (thereby reducing the total number of data transfers), such asymmetric compute loading may potentially idle N−1 GPUs (while the single GPU executes the partial-product reduction) and also incurs higher operational latency as additional data transfers are required to and from the ITC switch after the partial-product reduction.

Figure 3:
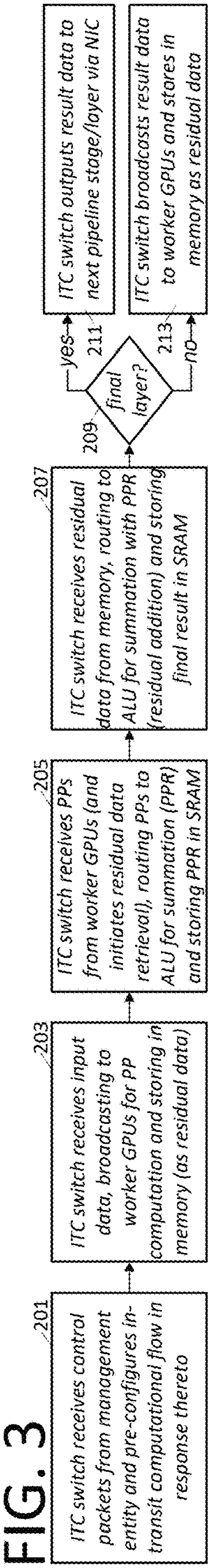
FIG. 3 illustrates an exemplary operational flow implemented within the FIG. 1 AI engine/compute system, focusing on operations within the ITC switch component(s)

FIG. 3 illustrates an exemplary operational flow implemented within the FIG. 1 AI engine (compute system 100), focusing in particular on operations within ITC switch 101. At 201, the ITC switch receives control packets from a management entity (e.g., CPU 109, one or more of worker GPUs 103 and/or other entity delivering control information via NIC 107) and pre-configures computational flow via controller 125/steering circuitry 129 in response to those control packets—for example, establishing multiplexed data routing paths through steering/routing circuitry 129 so that selected data is routed to ALU 127 en route to other internal circuitry (e.g., SRAM 131) and/or external destinations such as GPUs 103, switch-attached memory 105, NIC 107, etc. The management entity may also issue control packets to the worker GPUs and to a memory controller implemented within memory subsystem 105 (e.g., routing such control packets through ITC switch 101) to establish computational flow—data reception/transmission/storage, operations to be executed with respect to received and/or stored data, etc.—within those components. At 203, the ITC switch receives input data via next/previous-stage interconnect port (e.g., data constituting the input for a perceptron processing layer implemented by the ITC switch and attached worker GPUs) and broadcasts the input data to the worker GPUs for partial-product computation. In the depicted example, the ITC switch also stores the data (as residual data to be added to the later completed matrix-multiplication product) within switch-attached memory—for example, outputting the data to the memory shown at 105 in FIG. 1. As shown at 205, after partial-product computation within individual worker GPUs (e.g., each worker GPU executing a matrix multiply of the input data with a respective fraction of a model-parameter matrix or filter-weight matrix), the ITC switch receives the partial products from respective worker GPUs and routes the partial products directly or indirectly to the ALU for summation (with optional switch-implemented dropout), storing the partial-product reduction (the N partial products are reduced by virtue of the summation to a single completed matrix-multiply product) in switch-internal memory buffer 131. During or after the partial product summation operation, the ITC switch initiates residual data retrieval (i.e., retrieving the original input data) from switch-attached memory, routing the residual data (upon reception from memory) to the ALU for summation with the partial-product reduction, storing the final result in SRAM (207). Thereafter, depending on whether the result of the residual addition (i.e., sum of residual data and partial-product reduction) constitutes the final output of the processing layer (affirmative or negative determination at 209), the ITC switch either outputs the result data to the next processing (pipeline) stage or layer via the network interface at 211 or broadcasts the result of the residual addition to the worker GPUs at 213 (optionally storing the result data in switch-attached memory for next-stage/next-layer processing in the latter case).

Figure 4:
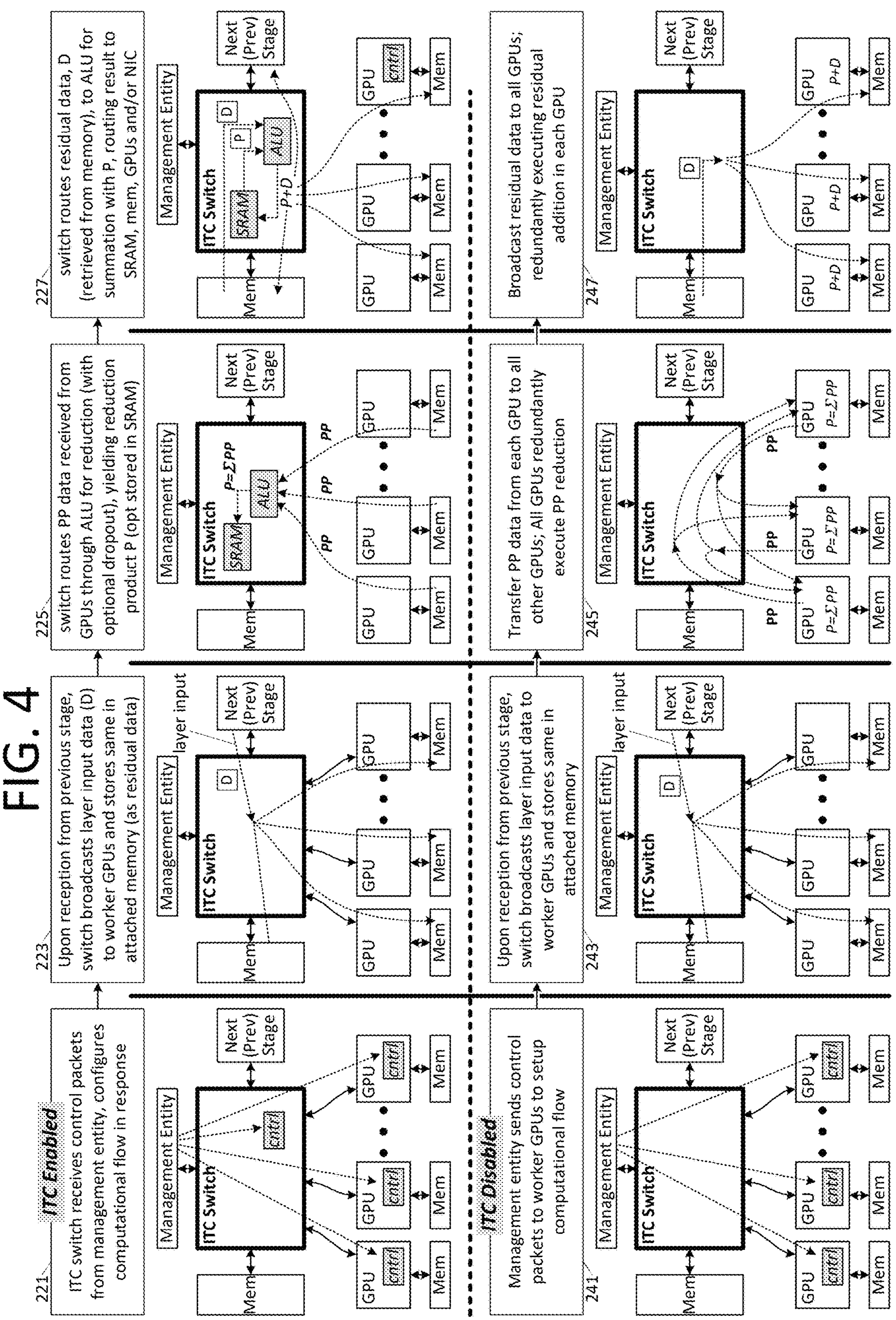
FIG. 4 illustrates exemplary processing operations within the ITC switch of FIGS. 1 and 2, contrasting ITC-enabled operation and ITC-disabled operation.

FIG. 4 illustrates exemplary processing operations within the ITC switch of FIGS. 1 and 2, contrasting ITC-enabled and ITC-disabled operation. When in-transit-compute is enabled (upper half of FIG. 4), the ITC switch receives and responds to computation-flow control packets from the management entity at 221 (the management entity may additionally issue computation-flow control packets to the worker GPUs and/or control circuitry within switch-attached memory). For example, the ITC switch may respond to incoming control packets by configuring/enabling in-transit-compute functions within the ITC switch, configuring switched routing paths (interconnections) between interface-connected devices and the switch-embedded ALU (e.g., for routing partial-products from GPUs to the ALU) and/or between/among the interface-connected devices, (e.g., routing/broadcasting input data received via NIC to individual worker GPUs and to switch-attached memory, etc.). Upon receiving layer input data from a prior processing stage (e.g., via FIG.-1 NIC 107), the ITC switch broadcasts the input data to the worker GPUs (which in turn execute partial matrix-multiply operations to produce partial products, PP) and stores the input data in attached memory (223). In accordance with the ITC-enabling control packets from the management entity (i.e., operation 221 as discussed above), the ITC switch routes partial-product data received from respective worker GPUs through the embedded ALU for in-situ summation (partial product reduction) with optional dropout, yielding reduction product, P (i.e., completed matrix multiply product) as shown at 225. Accordingly, when in-transit compute is enabled, only N partial product transfers are required to implement partial product reduction (as compared to $N^2$ with ITC disabled) and only one partial product summation operation (as opposed to N). Moreover, as the completed matrix multiply product (P) is already resident in the switch (stored, for example, in SRAM or other buffer memory within the switch IC) and the residual data is available via switch-attached memory, the switch may also retrieve the residual data from memory (an operation that may be initiated concurrently with the partial product reduction) and route the residual data and completed product data through the ALU for summation as shown at 227—effecting the residual addition in a centralized operation without redundancy (contrast the N−1 redundant residual additions in the ITC-disabled case as well as the N additional data transfers required to deliver the residual data to the N worker GPUs). Thereafter, the ITC switch routes the residual addition result to any one or more of the internal memory buffer (e.g., SRAM 131 of FIG. 1), switch-attached memory, worker GPUs and/or network interface component according, for example, to next operation required within the AI model compute graph.

Storage of the residual addition result within the internal memory buffer of the IT switch may be implemented, for example, through a read-modify-write (RMW) operation in which an operand read out of the memory buffer (e.g., element of completed matrix multiply) is routed through the ALU for summation with the other operand (e.g., residual data element) and then written back to the memory buffer in place of the originally sourced operand (i.e., such that the result of the residual addition overwrites the completed matrix multiplication result within buffer memory). Such RMW operation may likewise be implemented with respect to operands read out of memory during partial product reduction (e.g., a sequence of RMW operations to yield, within buffer memory, an updated accumulation total as each partial product is added to the buffer memory content).

With ITC disabled (lower half of FIG. 4), the management entity sends control packets to worker GPUs (and optionally to the switch and/or switch-attached memory controller) to setup computational flow (241). Upon receiving layer input data from a prior processing stage (e.g., via the NIC shown at 107 in FIG. 1), the switch IC broadcasts the input data to the worker GPUs and optionally stores the input data in attached memory (243). Thereafter, each worker GPU performs a partial-matrix multiply (e.g., each multiplying the input data against a respective matrix of model parameters) to produce respective partial products (PPs). At 245, the switch transfers PP data from each GPU to all other GPUs-receiving respective partial products from N worker GPUs in N inbound transfers and then outputting each of the N partial products to N−1 non-sourcing GPUs (i.e., the GPUs that did not source the subject partial product) in N*(N−1) outbound transfers for a total of $N^2$ partial-product transfers. Upon obtaining all N partial products, each of the N worker GPUs executes a partial product reduction to produce a complete matrix multiply product (P, where $P=\Sigma(PPi)$, for i=0 to N−1) so that a total of N identical partial product reductions are executed (N−1 redundant executions). At 247, the switch IC retrieves the residual data from attached memory and broadcasts the residual data to each of the N GPUs (N residual-data transfers). Each GPU, in response, executes an identical residual addition operation (adding the residual data, D, to the completed matrix-multiply product, P) so that N−1 redundant/duplicative residual additions are carried out within the worker GPUs.

Figure 5:
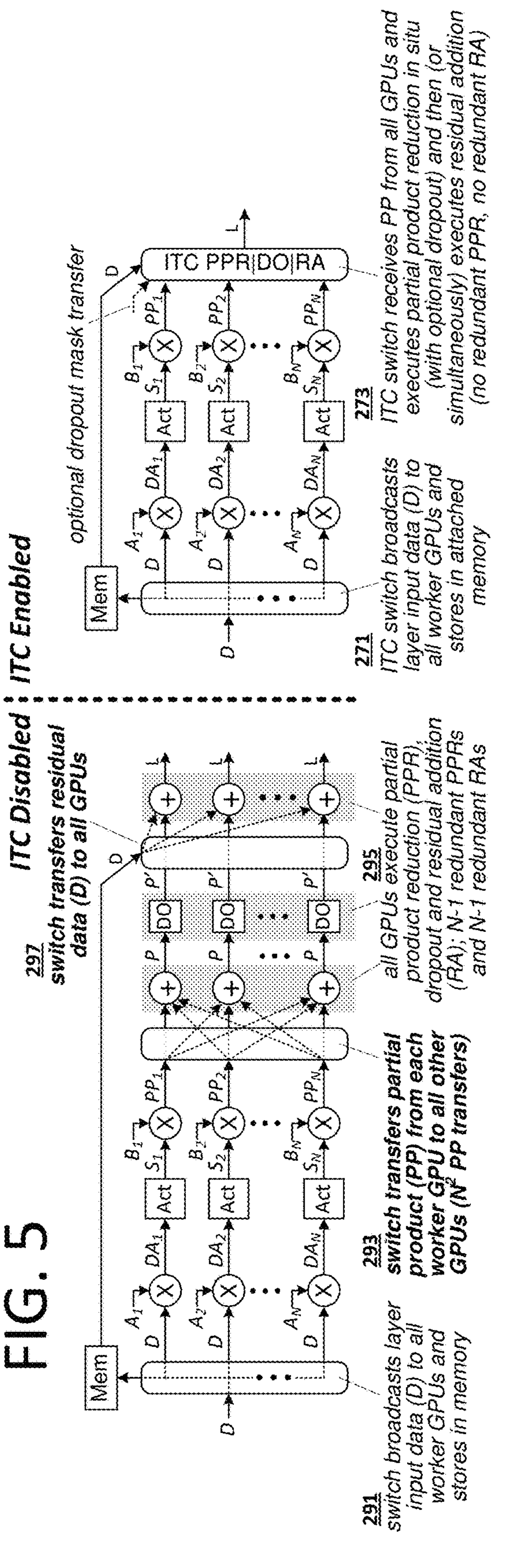
FIG. 5 illustrates exemplary operations of an ITC switch in the context of a generalized compute graph (e.g., for a multi-layer perceptron or any other practicable/useful compute model), contrasting ITC-disabled and ITC-enabled progressions.

FIG. 5 illustrates exemplary operations of an ITC switch in the context of a generalized compute graph (e.g., for a multi-layer perceptron or any other practicable/useful compute model), contrasting ITC-disabled and ITC-enabled progressions at left and right sides of FIG. 5, respectively. When in-transit-compute is enabled (righthand side of FIG. 5), the switch IC broadcasts the input data to the worker GPUs (271) which, as before, execute a first-stage matrix multiply with activation and then a second stage matrix multiply to produce respective partial product results ($PP_1$, $PP_2$, . . . , $PP_N$), conveying those results to the ITC switch. Instead of broadcasting each of the partial-product results to the non-sourcing processing engines however, the ITC switch routes the partial products to the embedded ALU for a centralized and singular partial product reduction as shown at 273, fusing that operation with the dropout function and also the residual addition—for example, executing an advance retrieval of the residual data from switch-attached memory to enable the residual addition to occur immediately after partial product reduction or as part of the partial product reduction (e.g., residual data serving as an operand in a single-clock-cycle summation of three or more operands). Accordingly, configuring the ITC switch for in-transit compute significantly lowers the data transfer and compute overhead required to complete the layer processing, obviating the $N^2$ data block transfers otherwise required to deliver the full complement of partial products and residual data to all processing engines, and avoiding the N−1 redundant partial product operations and N−1 redundant residual data additions typically required without in-transit compute. None of the GPUs need store more than a single data block (input data, then cumulatively generated partial product), preserving critical GPU memory capacity and bandwidth.

In a forward pass through the ITC-disabled compute graph (lefthand side of FIG. 5, progressing from left to right), the ITC switch implements an identity function with respect to incoming data (D) at 291, broadcasting the data to multiple parallel processing engines (e.g., worker GPUs) which in turn execute respective partial matrix multiply operations (yielding first-stage products $DA_1$, $DA_2$, . . . $DA_N$) and activation functions (shown generally as "Act" which may, in all activation-function instances herein, include rectified linear unit (ReLU) functions of various types, scaled exponential linear unit (SeLU), Gaussian error linear unit (GeLU), various sigmoid functions, tanh functions, softmax, probit and/or any other useful non-linear or linear functions). In the depicted example, the parallel processing engines multiply their activation results ($S_1$, $S_2$, . . . $S_N$) with respective components of matrix B ($B_1$, $B_2$, . . . $B_N$) to produce respective partial products ($PP_1$, $PP_2$, . . . $PP_N$), conveying those partial products to the switch IC to be broadcast to counterpart processing engines as shown at 293 (e.g., each GPU receives the partial products generated by the other N−1 GPUs). Thereafter, as shown at 295, each processing engine executes a partial product reduction (adding the N partial products together) to yield a completed matrix-multiply result (P) and then applies a dropout function to that result (e.g., identical instances of a dropout mask are generated within or delivered to each of N worker GPUs and applied to the completed matrix-multiply result) to yield a final stage result, P' (a matching instance thereof being generated within each of the N processing engines). At 297, the switch IC retrieves the residual data from memory and broadcasts the residual data to all processing engines which, in turn, execute residual addition operations (i.e., each GPU adding the residual data (D) and final stage result (P') to produce a layer output, L.

Figure 6:
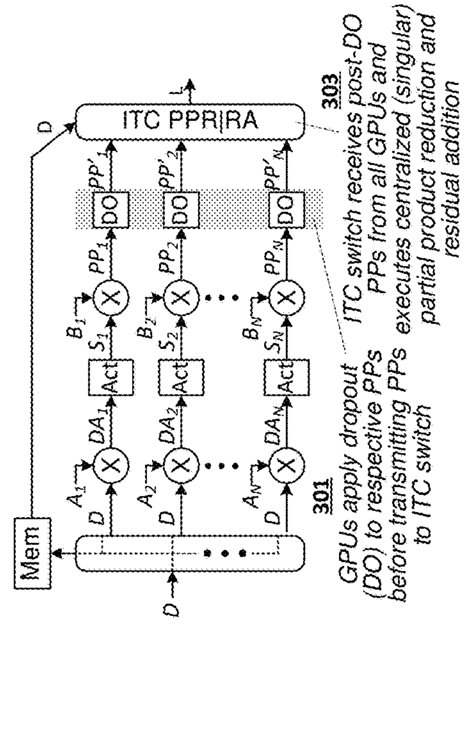
FIG. 6 illustrates exemplary ITC switch operation in conjunction with a revised/alternative compute graph.

FIG. 6 illustrates exemplary ITC switch operation in conjunction with a revised/alternative compute graph. More specifically, instead of executing the dropout function within the ITC switch, each of the processing engines (e.g., worker GPUs) applies the dropout to its respective partial product as shown at 301, thereby outputting respective dropout-processed partial products (PP'1, PP'2, . . . , PP'N) to the ITC switch. Upon receiving the dropout-processed partial products, the ITC switch executes a centralized (in situ) partial product reduction (adding the dropout-processed partial products together) and residual addition as shown at 303—as described in reference to FIG. 5 above except without centralized dropout (as dropout has been applied pre-reduction).

Figure 7:
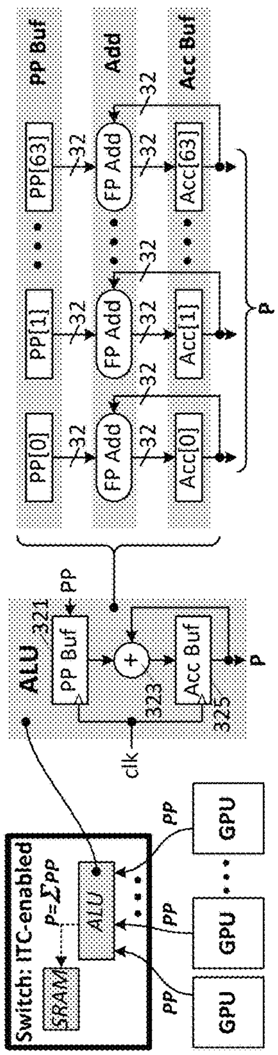
FIG. 7 illustrates an alternative arithmetic/logic unit (ALU) embodiment that may be implemented within the ITC switch to accommodate the arrangement shown in FIG. 6—having a partial-product buffer, summation circuitry and accumulation buffer, but lacking dropout circuitry.

FIG. 7 illustrates an alternative ALU embodiment that may be implemented within the ITC switch (i.e., implementing FIG.-1 processing engine 127 in whole or part) to accommodate the arrangement shown in FIG. 6—having a partial-product buffer 321, summation circuitry 323 and accumulation buffer 325 (all of which operate generally as described above with respect to circuit blocks 155, 159 and 161 of FIG. 2), but lacking dropout circuitry. As in the FIG. 2 implementation, buffers 321 and 325 (and constituent registers thereof) and adder circuits are sized to operate, in each clock cycle, on sixty-four 32-bit floating point values (e.g., IEEE FP32) but may be enlarged or reduced to operate on larger or smaller quantities of values in alternative embodiments and/or larger or smaller floating-point or other numeric formats (FP8, FP16, FP64, etc. or any other practicable numeric format).

Figure 8:
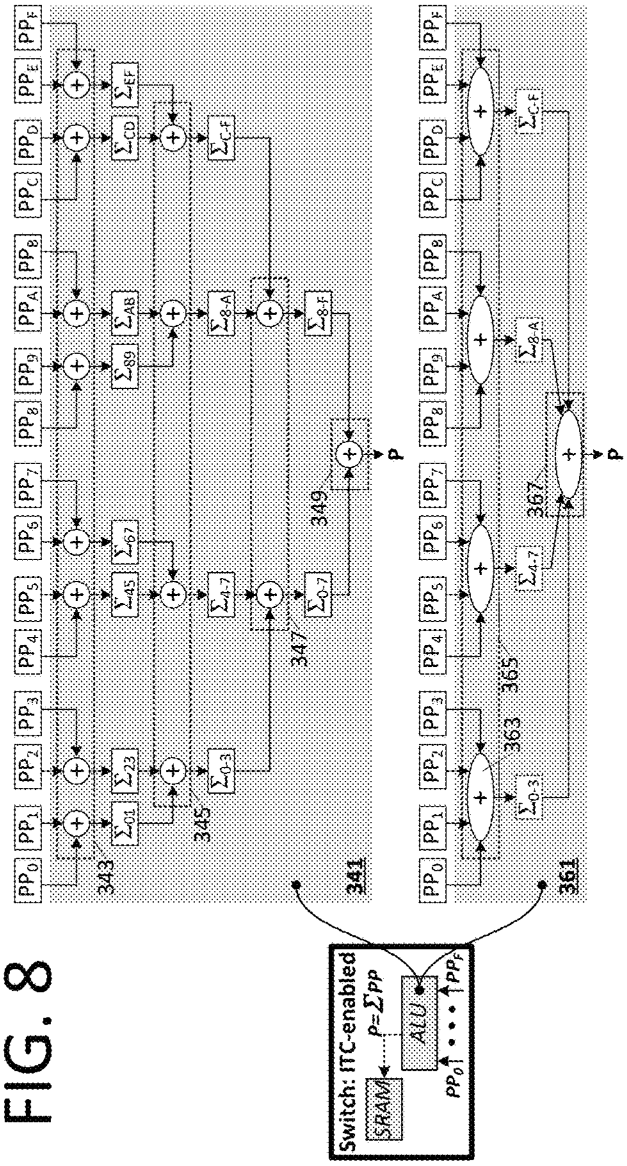
FIG. 8 illustrates ALU embodiments capable of simultaneously or concurrently (at least partly overlapping in time) adding more than two operands per summation cycle—an increased parallelism (relative to the ALUs shown in FIGS. 2 and 7) that enables summation of N partial products in fewer than N summation cycles.

FIG. 8 illustrates embodiments of ALUs that may be deployed within FIG.-1 processing engine 127 and that are capable of simultaneously or concurrently (at least partly overlapping in time) adding more than two operands per summation cycle—an increased parallelism (relative to the ALUs shown in FIGS. 2 and 7) that enables summation of N partial products in fewer than N summation cycles. In the embodiment at 341, for example, four summation stages (343, 345, 347, 349) are cascaded to generate a sum of sixteen total operands (N=16), adding eight pairs of operands in first stage 343 to produce four pairs of operands, adding those four pairs of operands in second stage 345 to produce two pairs of operands, adding those two pairs of operands in third stage 347 to produce a final pair of operands and adding that final operand pair in fourth stage 349. In the depicted example, the inputs to each summation stage are buffered (with outputs of the first three summation stages being clocked into buffers/registers for the subsequent summation stage) so that a total of four summation cycles (four cycles or two cycles, depending on whether both rising and falling clock edges are used to trigger register-load operations) are required to complete the partial product reduction—$\log_2(N)$ summation cycles rather than the N summation cycles required for the accumulators shown in FIGS. 2 and 7. In the embodiment at 361, each adder circuit 363 generates a sum of four operands (rather than two operands per adder as shown in the example at 341), so that only $\log_4(N)$ summation stages (two summation stages 363 and 365 in this N=16 example) and $\log_4(N)$ summation cycles are required to complete the partial product reduction. In yet other embodiments, adder circuits disposed within the same or different summation stages may receive and add non-uniform numbers of operands. As an example, ten first-stage four-operand adders, two second-stage five-operand adders and a single third/final-stage two-operand adder may be deployed to add N=40 partial products. Alternatively, the second stage summation circuit in the N=40 example may be implemented by two four-operand adders and one two-operand adder (instead of two 5-operand adder circuits) and then the third stage implemented by a three-operand adder circuit. Also, in all such cases, wherever multiple stages of addition may be completed without exceeding summation-cycle timing closure requirements (i.e., meeting setup and hold time requirements), buffer/register storage between those two stages may be omitted or bypassed (i.e., effectively collapsing the two summation stages into a single summation stage). Further, iterative (incrementally accumulated) summation (as in the FIG. 2 and FIG. 7 examples) may be carried out within modified instances of the FIG. 8 architectures. As an example, where data path widths permit more than a single partial product and fewer than all partial products to be simultaneously/concurrently loaded into the ALU (e.g., partial product buffer that feeds first-stage summation circuitry is large enough to hold more between 2 and N/2 partial products), the final stage output may be accumulated over multiple summation cycles. Also, as discussed in reference to FIG. 2, residual data may be input to any one or more summation stages within the FIG. 8 embodiments to fuse the residual addition and partial product reduction. Likewise, though not specifically shown, a dropout function may be implemented at any one or more summation stages within the FIG. 8 architecture (e.g., zeroing or otherwise pre-setting the value of a given operand).

Figure 9:
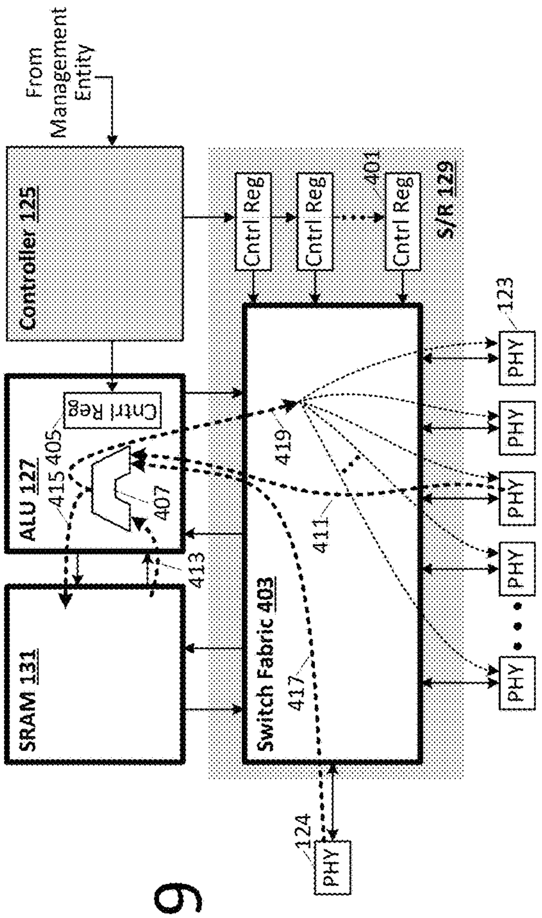
FIG. 9 illustrates exemplary circuitry provided within the ITC switch of FIG. 1 to selectively route data streams through ALU 127 and specify algorithmic/logic functions to be executed within ALU 127 with respect to those data streams.

FIG. 9 illustrates exemplary circuitry provided within the ITC switch of FIG. 1 to (i) selectively route data streams—received from internal memory buffer (e.g., SRAM 131), worker GPUs 103, switch-attached memory 105, NIC 107 and/or management entity—through ALU 127 and (ii) specify algorithmic/logic functions to be executed within ALU 127 with respect to those data streams. In the depicted embodiment, control circuitry 125 responds to control information received from a management entity (e.g., control packets received via a PCIe PHY or other PHY, not specifically shown) by programming one or more switch-configuration registers 401 within steering/routing circuitry 129 to pre-configure data routing through switch fabric 403 and programming one or more operation-control registers 405 within ALU 127 to specify arithmetic and/or logical operations (e.g., multiply, add, multiply-and-accumulate, Boolean operations, data format conversions and/or any other practicable/useful operations) to be executed, with respect to one or more incoming operand-data streams, within operation circuitry 407. In the case of a partial product reduction, for example, switch-configuration register(s) 401 are programmed to deliver (via switch fabric 403) partial-product data streams received from respective worker GPUs (i.e., via PHYs 123 as shown by the example at 411) to ALU 127 for summation with an accumulated sum read out of SRAM 131 (as shown at 413), with the summation result written back to SRAM 131 as an updated accumulation value (415). After partial products from all worker GPUs have been routed to ALU 127 and accumulated therein (yielding a finalized partial-product reduction, PPR), a residual value received via memory PHY 124 (i.e., retrieved from switch-attached memory) is routed through switch fabric 403 either directly to ALU 127 (i.e., for summation with the PPR) or into SRAM 131 for subsequent transfer to ALU 127 (i.e., as established by routing/control information within one or more of registers 401), in either case being added to the PPR within operation circuitry 407 to yield a residual-addition (RA) result. In the depicted example, the RA result is routed back through switching fabric 403 (per routing/steering specified by one or more of switch-configuration registers 401) to all worker GPUs as shown at 419 (i.e., switch fabric 403 broadcasting the RA result to respective PHYs 123) and optionally to switch-attached memory via PHY 124 (routing not specifically shown). The RA value may additionally or alternatively be stored within SRAM 131 and/or routed to a network interface component (NIC) via another PHY 123 (according, for example, to control information programmed within register(s) 405). After the partial-product-reduction and residual-addition operations (i.e., in-transit-compute operations) have been completed and the resulting data routed/steered to register-specified destinations, the same operations may be repeated (partial-product reduction and residual addition) or registers 401 and/or 405 may be reloaded via controller 125 with routing/operational control information to implement alternative operations (e.g., in accordance with compute-graph processing within the host compute system). Though not specifically shown, switching/routing circuitry 129 (and/or any of PHYs 123, 124 and/or ALU 127) may include circuitry to strip or otherwise manage various layers of header information and/or control blocks within packetized data streams so that, for example, operand data (data payload) is delivered to operational circuitry 407 within ALU 127—restoring, adding otherwise managing/revising such header information with respect to various data streams output from ALU 127 via switch fabric 403. When the ITC function is disabled or bypassed (for example, in response to control information programmed within one or more of registers 401 and/or 405), the ITC switch routes traffic between ports (e.g., implemented in whole or part by PHYs 123, 124) without traversing ALU 127—including routing traffic between one or more ports and SRAM 131. Moreover, such port-to-port traffic routing may be carried out concurrently with ALU operation—for example, routing data received via a selected one or more of PHYs 123 through switch fabric 403 to ALU 127 (e.g., to be added with data previously stored within SRAM 131 or otherwise operated upon) while at the same time routing traffic between any two or more of PHYs 123/124 without traversing ALU 127, including simultaneously routing data from a given one of PHYs 123/124 to both the ALU and one or more others of the PHYs 123/124.

FIG. 10 illustrates another application of the FIG.-1 ITC switch (101), in this case relocating storage of gradient-descent operands—gradients and optimizer states used to iteratively update weighting values during training of a generative and/or inferencing artificial-intelligence (AI) model—from worker GPU memory to switch-attached memory and also shifting otherwise duplicative gradient and optimizer-state update operations from the worker GPUs to the ITC-switch compute engine, substantially reducing training-time demands on GPU memory capacity and bandwidth and obviating duplicative, power-consumptive update computation.

Referring first to the baseline gradient-descent weight-update operation shown at 450, gradients ($\nabla L(\theta_t)$) and optimizer states ($m_t$, $g_t$) are retrieved from their respective storage locations within GPU-attached memory 451 (an operation executed within each GPU 453 involved in data-parallel training, with each worker GPU receiving a respective slice of the training data) and (i) with the latter (optimizer states) updated by the corresponding worker GPU in a first set of computations, and then applied to calculate updated weighting values (i.e., revising weighting values from $\theta_t$ to $\theta_{t+1}$, where 't' is the iteration index or state)—operations enumerated 1-4 within operational sequence 450. Thereafter, in operations 5-8, each of the N worker GPUs (i.e., participants in data-parallel training) loads the updated weights into its local operand registers, writes the updated optimizer states back to local memory, computes updated gradients and then writes the updated gradients back to local memory. Thus, as shown in expanded view 460 of a selected worker GPU 453 and attached memory 451 and expanded view 464 of the attached memory, each of N worker GPUs (i) reads and then writes back (from/to GPU-attached memory) the complete set of gradients and optimizer states needed for weight-update computations and (ii) computes the same updated optimizer states and updated gradients (i.e., same mathematical results in each GPU).

Still referring to FIG. 10, the centralized compute engine within ITC switch 101 is leveraged in a number of AI-training implementations to revise the operational sequence shown at 450, avoiding duplicative storage of gradients and optimizer states (reclaiming critical GPU-attached memory bandwidth and capacity) and reducing duplicative state-variable computation. More specifically, observing that the accumulated/averaged gradients are used only in initial optimizer-state computations and not in subsequent computations yielding the final weight update, those optimizer state update computations are re-allocated to the ITC switch (i.e., to the compute engine therein) in the revised (exemplary) operational sequence to avoid duplicative computation of the optimizer state updates within each of the N GPUs and enable storage of the accumulated/averaged gradient to be relocated from the N duplicative instances within GPU-attached memory 451 to a single instance within switch-attached memory 105. Further, to parallelize retrieval of optimizer states across multiple ITC-switch PHYs, the optimizer states are stored in fractions within respective GPU-attached memories—each GPU-attached memory 451 storing a $1/N^{th}$ shard (fraction, fragment) of the full complement of optimizer states, further saving GPU-attached memory bandwidth/capacity.

In the FIG. 10 embodiment, the sequence of weight-update operations shown at 450 is revised as shown at 460, with the ITC switch 101 retrieving gradients from switch-attached memory 105 and respective shards of optimizer states from participating worker GPUs 453 (i.e., N respective shards collectively making up the full complement of optimizer states, $m_t$ and $g_t$), calculating updated optimizer states ($m_{t+1}$, $g_{t+1}$) and broadcasting the updated optimizer states to the participating GPUs—enumerated operations 1-4 within sequence 480. Upon receiving the updated optimizer states, each of the GPUs applies the updated optimizers to compute updated weighting values, writes the updated weights to GPU-internal registers and stores a respective shard of the updated optimizers within GPU-attached memory (451) in operations 5-7. Concurrently with weight-update computations and/or shard storage (operations at 5 and 7, which themselves may be executed concurrently), ITC switch 101 computes the gradient updates and writes the updated gradients (accumulated/averaged gradients) to switch-attached memory 105 as shown in operations 8 and 9. Distributed storage of optimizer shards are shown at 485 and 487-*a* total storage reduced relative to that shown at 464 (i.e., with respect to operational sequence 450) by obviating GPU storage of gradients altogether and reducing per-GPU storage of optimizer state values by a factor of N.

FIG. 11 illustrates exemplary computations executed to generate updated weight operands (i.e., updating from weights, $\theta_t$, applied during prior iteration 't' to weights, $\theta_{t+1}$, to be applied during the current or upcoming generation 't+1'), including:

- computation of updated optimizer states ($m_t$+1, exponentially averaged gradient, and $g_t$+1, exponentially averaged gradient squared) using accumulated/averaged gradient ($\nabla L(\theta_t)$) and prior optimizer states ($m_t$, $g_t$);
- computation of bias-corrected optimizer states m-hat$_{t+1}$ and g-hat$_{t+1}$ using updated optimizer states ($m_{t+1}$, $g_{t+1}$) and iteration state (t); and
- computation of updated weights from optimizer ratio 'r'—a ratio of bias-corrected optimizer state m-hat$_{t+1}$ to square-root of bias-corrected optimizer state g-hat$_{t+1}$.

FIGS. 12 and 13 illustrate differing allocations of the Figure-11 weight-update computations between ITC switch 101 and worker GPUs 453 within the compute system of FIG. 10. In the embodiment of FIG. 12, ITC switch 101 acquires optimizer states from the N participating worker GPUs (i.e., getting a respective shard from each) and concurrently retrieves accumulated/averaged gradients from switch attached memory (operation shown collectively at 501). Thereafter the ITC switch (e.g., ALU or other compute engine therein) computes updated optimizer states (503) and then broadcasts the updated optimizer states to the N worker GPUs (505). Upon receiving the optimizer-state broadcast, each of the worker GPUs computes bias-corrected optimizer states and applies those bias-corrected optimizer states to generate optimizer ratios (e.g., optimizer ratio 'r' as shown in FIG. 11) at 507, computes updated weights using the optimizer ratios (509) and stores a respective shard of the updated optimizer state (511)—the latter to be retrieved and transmitted to the ITC switch for the next optimizer state update.

Referring to FIGS. 11 and 12, because weight-update arithmetic/logic operations within the ITC switch are limited those required to compute updated optimizer states, computation resources required within the ITC switch re correspondingly limited to floating-point addition and floating-point multiplication (i.e., multiplying the gradient and prior optimization-state values by respective parametric values and adding the products of those multiplications). In the FIG. 13 embodiment, by contrast, computation of the bias-corrected optimizer states and optimizer ratio (i.e., operations shown at 507 in FIG. 12) are shifted from the GPUs to the ITC switch (so that the ITC switch additionally broadcasts optimizer ratios as shown at 521), further reducing computational redundancy (i.e., single computation of bias-corrected optimizer states and optimizer ratios within ITC switch, rather than multiple duplicative computations of those values within N GPUs) but requiring instantiation and/or allocation of additional arithmetic/logic hardware within the ITC-switch compute engine, including computational circuitry to implement exponentiation, reciprocation and square-root operations (i.e., as shown in FIG. 11 computations) in addition to the floating-point multiply/addition operations required in the computational allocation of FIG. 12.

Within each of the computational architectures of FIGS. 12 and 13, optimizer states may be stored within switch attached memory rather than sharded across GPU-attached memory—an arrangement that, in the FIG. 13 embodiment, obviates transmission (broadcast) of the optimizer updates to the participating GPUs (i.e., need only broadcast only optimizer ratios at 521, not the optimizer states themselves as they will be stored in switch-attached memory) and the shard storage operation at 511 in favor of optimizer-update storage within switch-attached memory. Also, under both the FIGS. 12 and 13 embodiments, the various sequentially executed operations may be executed concurrently wherever practicable, in an order different from that shown, and/or within respective pipestages of a timing pipeline so that updated weighting values are delivered when needed and without stalling or otherwise delaying data propagation through the AI compute model. As discussed above, the ITC switch itself may operate with respect to any one or more of various signaling protocols and physical-layer specifications (e.g., PCIe, Ethernet, etc.) and may support various higher level open or proprietary interconnect standards/specifications, including cache-coherent standards such as CXL (e.g., to create a common memory space for connected devices)

and CAPI, fabric connectivity standards such as Gen-Z, etc. Moreover, while a single ITC switch component is depicted in FIG. 11 and others herein, in all such cases a switch fabric formed by two or more interconnected ITC switches or one or more ITC switches interconnected with one or more switches lacking int-transit-compute functionality. In an exemplary implementation shown in FIG. 14, for instance, three ITC switches 101*a*, 101*b*, 101*c* are interconnected to form a collective switch fabric 530 that implements the ITC switch operations shown in FIGS. 12 and 13, with component operations distributed among the fabric-constituent switches. In the specific example shown, ITC switches 101*a* and 101*b* are coupled to respective groups of sixteen GPUs within an N=32 GPU AI compute system. By this arrangement, optimizer shard retrieval (per operation 501 of FIG. 12) may be split between two or more ITC switches (reducing the workload on each) while another ITC switch (e.g., 101*c*) retrieves gradients from switch-attached memory, with optimizer state values and gradients exchanged between the fabric-constituent switches as necessary to complete allocated weight-update computations.

Figure 15:
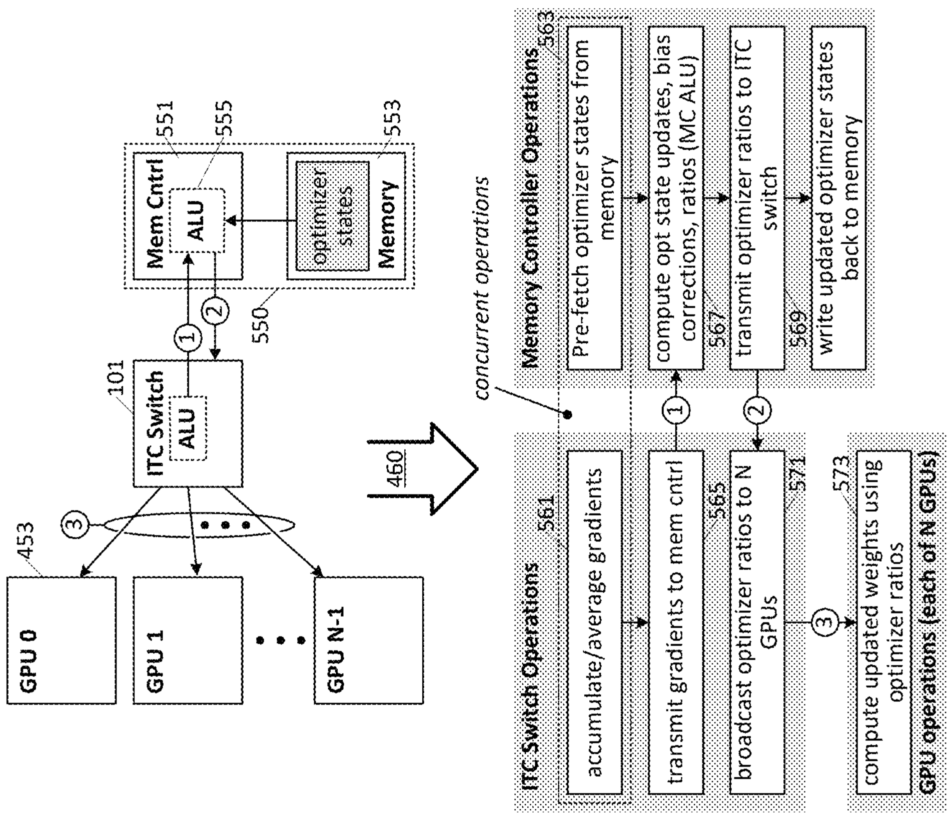
FIG. 15 illustrates an alternative computational architecture having an ITC switch and switch-attached GPUs together with a memory subsystem having in-situ computation circuitry.

FIG. 15 illustrates an alternative computational architecture having an ITC switch 101 and switch-attached GPUs (N worker GPUs 453, attached memories not specifically shown) as discussed above, together with a memory subsystem 550 having in-situ computation circuitry—that is, a memory control component 551 coupled to one or more memory components 553 (e.g., one or more DIMMs, high-bandwidth memories (HBMs), etc.), with the former having an on-chip compute engine 555 ("ALU"). Under this architecture, ITC switch 101 may accumulate and average gradients (as in embodiments discussed above) concurrently with optimizer-state pre-fetch within memory controller 551—as shown within exemplary operational flow (560) at 561 and 563. The ITC switch transmits the gradients to the memory controller (565) which, in turn, computes optimizer state updates, bias corrections and optimizer ratios (i.e., within compute engine 555) at 567, transmitting the optimizer ratios to the ITC switch (569) for broadcast to the N GPUs (571). Upon receiving the optimizer ratios, the GPUs compute updated weights at 573 (e.g. registering the updated weights for application with respect to incoming training data). Though not specifically shown, ITC switch 101 (which may alternatively be a switch lacking an in-transit compute function in this embodiment) may write the updated (accumulated/averaged) gradients back to switch attached memory (e.g., memory subsystem 560 or other switch attached memory) concurrently with GPU weight-update computations or at any other practicable time, retrieving the updated gradients in time for subsequent weight-update iteration. Similarly, memory controller 551 may write updated optimizer states back to memory component 553 concurrently with the optimizer broadcast (571), weight-update computations (573) or any other practicable time. Regardless of write-back timing, storage of the gradients and optimizer states within switch-attached memory subsystem 550 and allocation of optimizer ratio computation to compute circuitry within memory controller 551 (and/or ITC switch 101) preserves critical GPU memory bandwidth/capacity and frees GPU processing resources.

Figure 16:
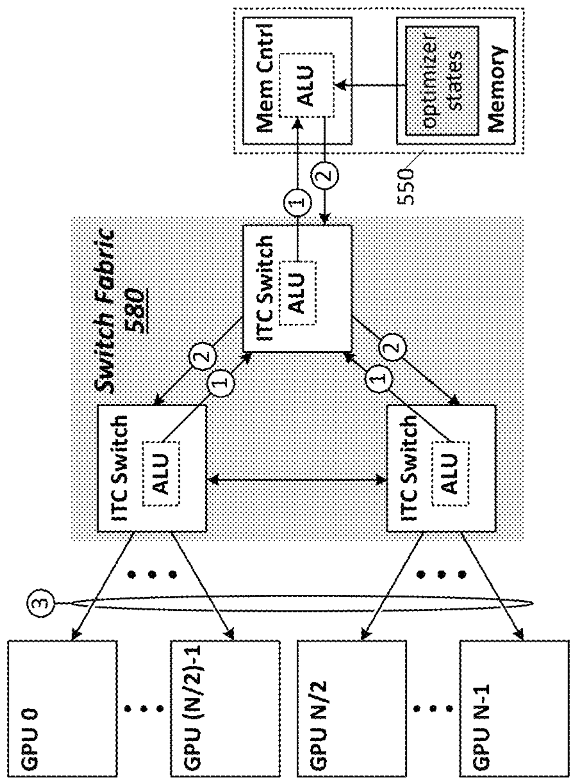
FIG. 16 illustrates an alternative embodiment of the compute system of FIG. 15 having a switch fabric formed by multiple ITC switches.

FIG. 16 illustrates a compute system architecture similar to that of FIG. 15 but having a multiple-ITC-switch fabric 580. As discussed in reference to FIG. 14, the switch fabric architecture enables broadcast operations (e.g., broadcasting optimizer ratios to each of N GPUs) to be split between two or more ITC switches and likewise enables one or more ITC switches to exchange information with memory subsystem 550 while one or more others exchange information with respective subsets of N worker GPUs.

Referring to FIGS. 1-16 generally, any and all of the ITC switch embodiments presented herein may be implemented within a standalone integrated circuit component or packages or within one or more IC components (including packages having multiple IC dies) that combines in-transit-compute and data-stream routing functions with one or more other functions (e.g., memory control function, network interface function, etc.). Also, one or more programmed/programmable microcontrollers and/or dedicated hardware circuits (e.g., finite state machines, registered or combinational circuits, etc.) may implement and/or control all or part of the various architectural and functional elements within the ITC switch embodiments herein. Additionally, any or all of the various ITC switch embodiments presented herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the number and type of individual components attached to ITC switch embodiments (e.g., number of worker GPUs) may be different from those shown and any practicable number of ITC switches may be deployed within a computing system. The various ITC-switch PHYs may be implemented in accordance with any practicable standards-based or proprietary specification, memory within or attached to the various ITC switch embodiments may be implemented by any practicable memory technology (e.g., DRAM, SRAM, and/or flash or other nonvolatile memory technology), constituent data values within data streaming through the ITC switch may have any practicable bit-depths and/or formats and thus may be different from those shown. Compute graphs and arithmetic/logic operations executed within the ITC switch and attached devices may be different from those shown and/or different operations may be performed at different stages of a given compute graph depending on data propagation direction (backward pass vs forward pass). Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit switch comprising:
- a network interface to receive an input data block;
- a memory interface to be coupled to a memory subsystem;
- processor interfaces to be coupled to respective processing entities;
- computational circuitry; and
- routing circuitry to:
  - convey the input data block to the processor interfaces for transmission to each of the processing entities and to the memory interface for storage within the memory subsystem as a residual instance of the input data block;
  - convey processed data blocks, generated respectively by the processing entities using the input data block and received via the processor interfaces, to the computational circuitry;
  - convey the residual instance of the input data block, retrieved from the memory subsystem via the memory interface, to the computational circuitry; and
  - convey a result data block, generated within the computational circuitry by arithmetically combining the processed data blocks and the residual instance of the input data block, to at least one of the network interface for transmission to a network destination or the processor interfaces for transmission to each of the processing entities.

2. The integrated circuit switch of claim 1 wherein the processor interfaces to be coupled to respective processing entities comprise a plurality of interfaces to be coupled respectively to a plurality of graphics processor units (GPUs).

3. The integrated circuit switch of claim 1 wherein the processor interfaces to be coupled to respective processing entities comprise a plurality of physical signaling interfaces implemented in compliance with a Peripheral Component Interconnect Express (PCIe) specification.

4. The integrated circuit switch of claim 1 wherein the processed data blocks generated respectively by the processing entities and received via the processor interfaces comprise a plurality of partial matrix-multiply products generated, respectively within the processing entities, by matrix-multiplying the input data block with a respective subsection of a parameter matrix.

5. The integrated circuit switch of claim 4 wherein the computational circuitry comprises an arithmetic-logic unit (ALU) to generate the result data block, in part, by adding the partial matrix-multiply products to one another to produce a completed matrix-multiply product representative of a matrix multiplication between the input data block and the parameter matrix.

6. The integrated circuit switch of claim 5 wherein the matrix-multiply product comprises a plurality of constituent data elements, and wherein the ALU comprises circuitry to set selected ones of the constituent data elements, specified by a drop-out mask value, to one or more predetermined values.

7. The integrated circuit switch of claim 6 further comprising circuitry to generate the drop-out mask value.

8. The integrated circuit switch of claim 5 wherein the ALU comprises circuitry to add the residual instance of the input data block to the completed matrix-multiply product to generate the result data block.

9. The integrated circuit switch of claim 8 further comprising a memory buffer and wherein the circuitry to add the residual instance of the input data block to the completed matrix-multiply product comprises circuitry to execute a read-modify-write (RMW) with respect to the memory buffer, including:
- reading constituent data elements of the completed matrix-multiply product out of the memory buffer;
- modifying the constituent data elements of the completed matrix-multiply product by adding thereto corresponding constituent data elements of the residual instance of the input data block and, by such modifying, generating constituent data elements of the result data block; and
- writing the constituent data elements of the result data block into the memory buffer in place of the constituent data elements of the completed matrix-multiply product.

10. The integrated circuit switch of claim 4 wherein the computational circuitry comprises an arithmetic-logic unit (ALU) to generate the result data block by adding the partial matrix-multiply products to one another and to the residual instance of the input data block.

11. A method of operation within an integrated circuit switch having a network interface, memory interface, processor interfaces and computational circuitry, the method comprising:

receiving an input data block via the network interface;

routing the input data block to the processor interfaces for transmission to respective processing entities and to the memory interface for storage, as a residual instance of the input data block, within a memory subsystem;

receiving, via the processor interfaces, respective processed data blocks generated by the processing entities using the input data block;

retrieving the residual instance of the input data block from the memory subsystem via the memory interface routing the processed data blocks and the residual instance of the input data block to the computational circuitry;

arithmetically combining the processed data blocks and the residual instance of the input data block within the computational circuitry to generate a result data block and routing the result data block to at least one of the network interface for transmission to a network destination or the processor interfaces for transmission to each of the processing entities.

12. The method of claim 11 wherein receiving the processed data blocks generated by the processing entities comprises receiving processed data blocks generated respectively by graphics processor units (GPUs) using the input data block.

13. The method of claim 11 wherein receiving the respective processed data blocks via the processor interfaces comprises receiving the processed data blocks via respective physical signaling interfaces implemented in compliance with a Peripheral Component Interconnect Express (PCIe) specification.

14. The method of claim 11 wherein the respective processed data blocks generated by the processing entities and received via the processor interfaces comprise a plurality of partial matrix-multiply products generated, respectively within the processing entities, by matrix-multiplying the input data block with a respective subsection of a parameter matrix.

15. The method of claim 14 wherein arithmetically combining the processed data blocks and the residual instance of the input data block within the computational circuitry comprises, at least in part, adding the partial matrix-multiply products to one another to produce a completed matrix-multiply product representative of a matrix multiplication between the input data block and the parameter matrix.

16. The method of claim 15 wherein the matrix-multiply product comprises a plurality of constituent data elements, and wherein adding the partial matrix-multiply products to one another to produce a completed matrix-multiply product comprises setting selected ones of the constituent data elements, specified by a drop-out mask value, to one or more predetermined values.

17. The method of claim 16 further comprising generating the drop-out mask value within the integrated circuit switch.

18. The method of claim 15 wherein arithmetically combining the processed data blocks and the residual instance of the input data block within the computational circuitry further comprises adding the residual instance of the input data block to the completed matrix-multiply product to generate the result data block.

19. The method of claim 18 wherein arithmetically combining the processed data blocks and the residual instance of the input data block within the computational circuitry further comprises (i) storing the completed matrix-multiply product in a memory buffer within the integrated circuit switch, and (ii) executing a read-modify-write (RMW) with respect to the memory buffer to add the residual instance of the input data block to the completed matrix-multiply product, including:

reading constituent data elements of the completed matrix-multiply product out of the memory buffer;

modifying the constituent data elements of the completed matrix-multiply product by adding thereto corresponding constituent data elements of the residual instance of the input data block and, by such modifying, generating constituent data elements of the result data block; and writing the constituent data elements of the result data block into the memory buffer in place of the constituent data elements of the completed matrix-multiply product.

20. The method of claim 14 wherein arithmetically combining the processed data blocks and the residual instance of the input data block within the computational circuitry comprises adding the partial matrix-multiply products to one another and to the residual instance of the input data block within an arithmetic-logic unit (ALU) to generate the result data block.

* * * * *